United States Patent [19]

Burns et al.

[11] 3,788,499

[45] Jan. 29, 1974

[54] TRANSFER CAR ARRANGEMENT

[75] Inventors: William E. Burns, Ottawa; Robin Taylor, Park Forest, both of Ill.

[73] Assignee: Interlake Inc., Chicago, Ill.

[22] Filed: Jan. 17, 1972

[21] Appl. No.: 218,405

[52] U.S. Cl............... 214/16.4 B, 104/48, 214/516
[51] Int. Cl. ............................................... B65g 1/06
[58] Field of Search............ 214/516, 16.4 B; 164/48

[56] References Cited
UNITED STATES PATENTS

| | | | |
|---|---|---|---|
| 537,720 | 4/1895 | Samuel et al. | 104/48 |
| 2,997,048 | 8/1961 | Gertken et al. | 104/48 X |

FOREIGN PATENTS OR APPLICATIONS

| | | | |
|---|---|---|---|
| 409,864 | 9/1910 | France | 104/48 |
| 414,386 | 3/1910 | France | 214/516 |
| 869,496 | 3/1953 | Germany | 104/48 |
| 466,139 | 1/1969 | Switzerland | 214/16.4 B |

*Primary Examiner*—Robert G. Sheridan
*Assistant Examiner*—R. B. Johnson
*Attorney, Agent, or Firm*—Molinare, Allegretti, Newitt & Urtcoff

[57] ABSTRACT

In a transfer car arrangement, particularly for the use in a storage and retrieval system, a load carrier which is movable longitudinally in the aisles between storage frames is positionable upon a transfer car for transfer between the aisles. Both the load carrier and the transfer car are floor running upon a coplanar floor surface and the load carrier includes rollers which cooperatively engage inclined ramps on the transfer car and which support the load carrier during transfer and the load carrier is supportably positioned upon the transfer car by powered lugs which engage the load carrier such that the load carrier wheels are spaced above the floor surface when the load carrier is being transferred.

13 Claims, 4 Drawing Figures

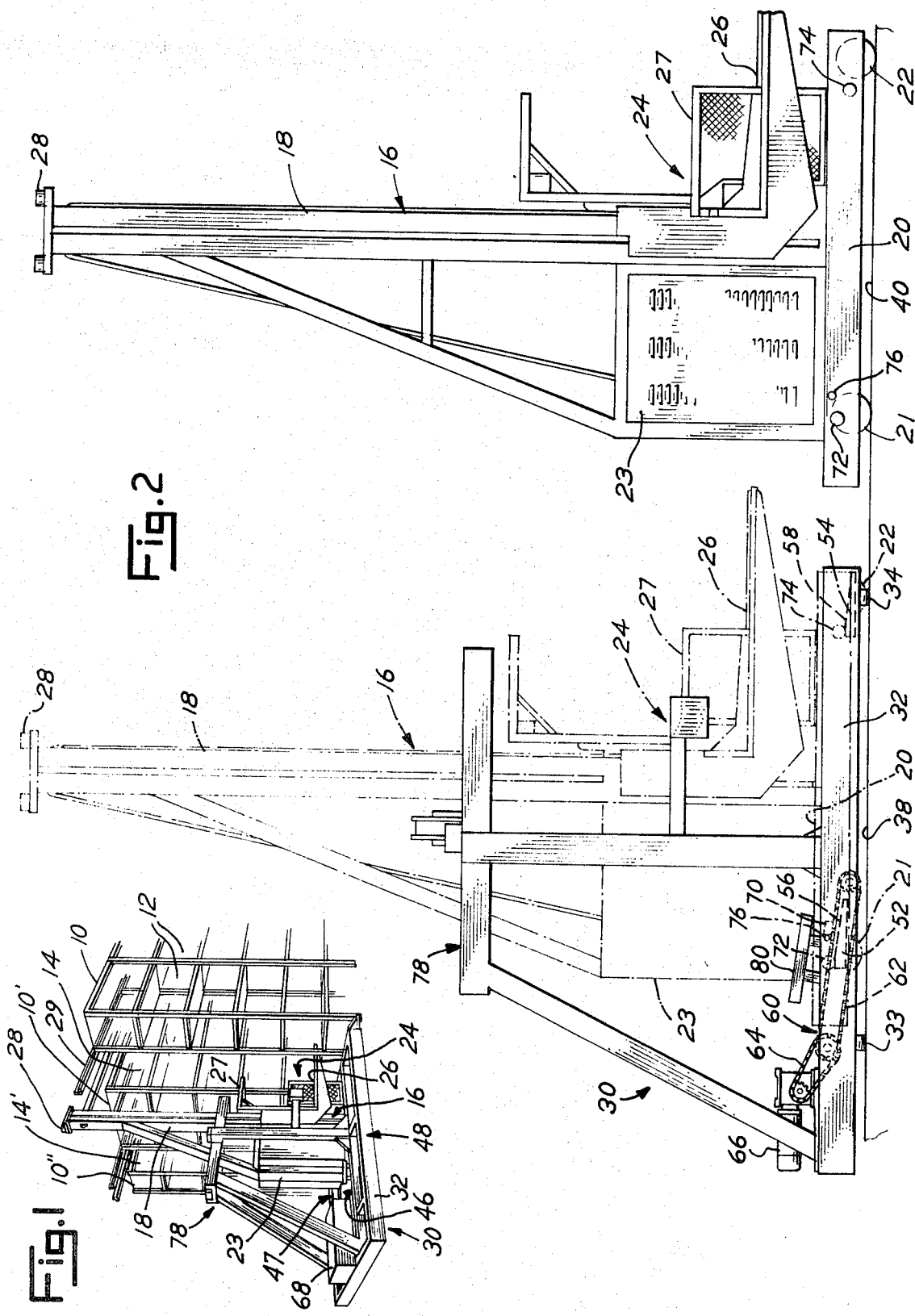

TRANSFER CAR ARRANGEMENT

BACKGROUND AND SUMMARY OF THE INVENTION

This invention relates to a transfer car arrangement and, more particularly, to a new and improved transfer car arrangement particularly adapted for use in a storage and retrieval system wherein a load carrier may be transferred between the aisles of storage frames.

In mechanized storage and retrieval systems, it is advantageous to transfer the article storing and retrieving load carrier between the various aisles of the storage frames in which the articles are stored in and retrieved from. Such transfer between aisles minimizes the cost of such systems, the load carriers employed in such systems frequently being large and expensive components of the system. In order to effect transfer of the load carrier between aisles, various transfer car constructions have been employed in the past which are movable transverse of the aisles and which are adapted to supportably receive the load carrier thereon during transverse movement of the load carrier and the transfer car between the aisles. The prior transfer car constructions, however, suffer several disadvantages. Where the transfer car is rollably suspended from an overhead beam construction, the cost of the overall storage and retrieval system is substantially increased since the overhead support structure which is necessary to insure that the usually extremely heavy transfer car with the load carrier thereon is adequately supported during the transfer operation. On the other hand, where the transfer car is supported upon the floor of the storage installation, elaborate pit and rail arrangements are generally necessary to insure adequate elevational alignment of the supporting bed of the transfer car upon which the load carrier is supported, with the aisles and the plane in the aisles in which the load carrier operates such that movement of the load carrier onto and off of the transfer car is smooth and rapid. Moreover, in either the prior overhead or floor supported transfer car arrangements, either elaborate pit or elevated rail constructions have been necessary in the aisles and/or at the ends of aisles in order to insure proper positioning and alignment of the transfer car bed and load carrier during movement of the latter onto and off of the former and to insure that the wheels of the load carrier are sufficiently supported above the floor surface over which the transfer car must transversely move during transfer since the load carrier must be transferred in a direction perpendicular to the direction in which it normally operates.

In the transfer car arrangement constructed in accordance with the principles of the present invention, both the vehicle or load carrier which is to be transferred and the transferring vehicle or transfer car may be operated and rollably supported upon a common coplanar floor surface without the need for elaborate and expensive overhead support, pit or rail constructions, and the close tolerances and personnel hazards associated with such constructions. In an arrangement incorporating the principles of the present invention, both a load carrier and a transfer car of a storage retrieval system may be operated longitudinally of the aisles and transversely of the aisles, respectively, upon wheels which are rollably supported upon a coplanar floor surface. In the arrangement of the present invention, the load carrier of a storage retrieval system may be readily positioned in coincidental relationship with a transfer car and supported upon the transfer car such that the load carrier wheels clear the floor of the storage space during transfer of the load carrier between the aisles of the space. The transfer car incorporating the principles of the present invention, includes inclined ramps which are inclined to the coplanar floor of a storage space and which cooperate with support rollers upon the load carrier to elevate the wheels of the load carrier above the floor surface during transfer of the load carrier between the aisles of the storage space and lugs move the support rollers up the inclined surfaces of the ramps such that the load carrier is supportably positioned on the ramps during transfer.

In a principal aspect of the invention, a multivehicle arrangement includes a first vehicle having means which supports the first vehicle upon and for movement in a given plane and in a first predetermined linear direction, and a second vehicle also having means which supports the second vehicle for movement upon and in the same given plane and in a second predetermined direction at a substantial angle to the first direction. The second vehicle also includes support means for receiving and supporting the first vehicle thereon during movement of the second vehicle when the first vehicle has been moved into coincidental relationship with the first vehicle, whereby both of the vehicles may be simultaneously moved in the second direction.

In another principal aspect of the invention, a storage and retrieval system includes a floor defining a storage area, a plurality of storage frames in spaced relationship to each other, the floor between the frames defining longitudinally extending aisles, and a load carrier means which is adapted to position articles to be stored relative to the storage frames. The load carrier means includes first support means movable relative to and in contact with the floor of the aisle for supporting the load carrier means for such longitudinal movement. The system also includes transfer means which is adapted to transfer the load carrier between the aisles, the transfer means including second support means which are also movable relative to and in contact with a portion of the floor adjacent at least one end of the aisles for supporting the transfer means for transverse movement between the aisles. The floors of the aisles and the portion of the floor adjacent the end of the aisles are coplanar with each other and means are cooperatively associated with the load carrier means and transfer means for receiving and supportably retaining the load carrier means upon the transfer means with the first support means of the load carrier spaced from the floor when the load carrier means is being transferred between the aisles.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a perspective view of a preferred embodiment of storage and retrieval system incorporating the principles of the present invention;

FIG. 2 is a side elevation view of a preferred embodiment of transfer car and load carrier of the storage and retrieval system of the present invention and showing the load carrier both prior to positioning upon the transfer car and positioned thereon for transfer;

DESCRIPTION OF THE PREFERRED EMBODIMENT

Figure 3:
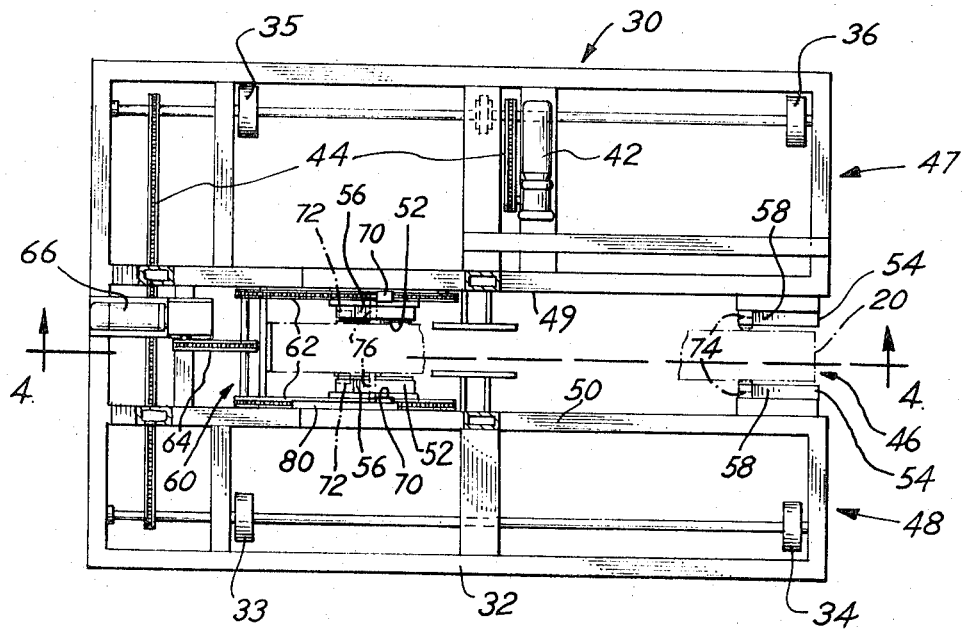
FIG. 3 is a plan view of a preferred embodiment of transfer car constructed in accordance with the principles of the invention.

Referring to FIG. 1, a multivehicle arrangement incorporating the principles of the present invention is shown in which the arrangement is embodied in a storage and retrieval system of a mechanized storage system. Such storage and retrieval system in general includes a plurality of spaced storage frames 10, 10' and 10'' having a plurality of suitable storage bins 12 spaced both vertically and horizontally of each other for receiving and holding the articles which are to be stored in and retrieved from the system. The respective storage frames are spaced from each other so as to define aisles 14 and 14' therebetween in which a suitable load carrier or vehicle 16 is adapted to longitudinally move up and down aisles 14 and 14' for the insertion and removal of desired articles into and from the bin. It will be understood that although only three storage frames and two aisles are shown, the system may, and usually does, include many more aisles and frames than those shown.

The load carrier 16 preferably includes a vertically extending mast 18 which extends upward from a suitable support bed 20 which, in turn, is adapted to be drivingly supported upon wheels or tires 21 and 22 for movement in and upon the floors of the aisles 14 or 14'. At least one set of these wheels 21 and 22 is preferably powered by a suitable drive motor or the like (not shown) which may be located in housing 23. Such load carrier also typically includes an elevatable lift platform 24 which is adapted to move up and down the mast 18 such that its extendible forks 26 or other suitable article handling means may be positioned in elevation adjacent the bin 12 in which it is desired to store or retrieve a given article and the forks 26 may be inserted into the bins. Although not essential to the present invention, an operator's cage 27 may also be mounted to the lift platform 24 in which an operator may position himself to operate the load carrier. Suitable guide means may also be provided, for example rollers 28 which are positioned adjacent the upper end of the mast 18 of the load carrier and which cooperate with overhead guide rails 29 to guide the movement of the load carrier in the aisles 14 and 14' of the storage space during article handling operations.

The storage and retrieval system of the present invention also includes a floor running transfer vehicle or car 30 which is adapted to move transversely of the aisles 14 and 14' upon the floor of the storage space adjacent an end of the aisles. The transfer car 30 is adapted to supportably receive the load carrier 16 thereon, such that when the load carrier is positioned upon the transfer car, the transfer car and load carrier may be moved transversely of the aisles to enable the load carrier to operate in more than one given aisle.

The specific structural details and components of both the load carrier 16 and transfer car 30 which do not form part of the present invention will not be described in detail herein. A principal aspect of the invention is the provision of a vehicle arrangement in which the transfer car and load carrier are both floor running and in which the surfaces of the floor upon which they run are coplanar so as to obviate the need for elaborate pit and/or rail arrangements in the positioning of the load carrier upon the transfer car and the transfer of the load carrier between the aisles. With this consideration in mind, the principal features of a preferred embodiment of transfer car and load carrier construction which accomplishes this purpose will now be described.

The transfer car 30 includes a rigid horizontal frame bed 32 which is preferably of rigid beam construction. A plurality of spaced wheels or tires 33, 34, 35 and 36 are rotatably mounted upon and at the corners of the bed 32 of the transfer car and are positioned in rollably supporting contacting relationship to the floor surface 38 adjacent the ends of the aisle floors 40. It will be seen, particularly when viewing FIG. 2, that both of these floor surfaces 38 and 40 are coplanar with each other. At least one set, and preferably both sets, of wheels 33–36 are powered by a suitable motor 42 or the like by way of a sprocket and chain construction 44 for movement of the transfer car 30 upon the floor 38 transversely of and adjacent the ends of the aisles.

Referring particularly to FIG. 3, the bed 32 of the transfer car generally comprises a U-shaped frame defining a load carrier berth 46 between the legs 47 and 48 of the frame. The distance between the inner most beams 49 and 50 of legs 47 and 48, respectively, and hence the width of the berth 46, is such that the bed 20 of the load carrier 16 may be received into the berth.

Figure 4:
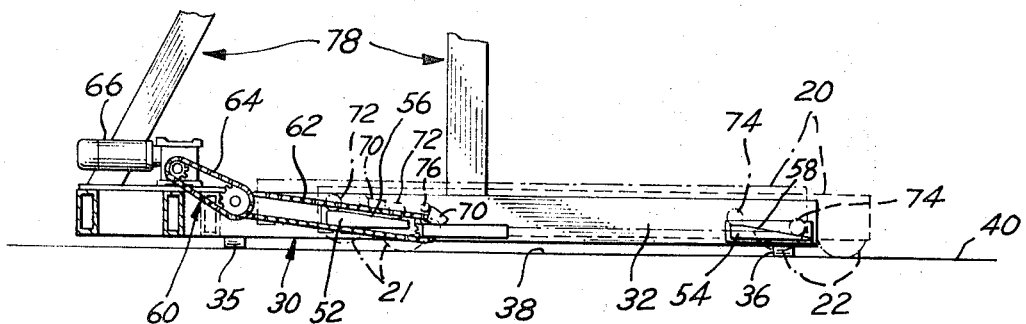
FIG. 4 is a partially broken cross-sectioned side elevation view of the transfer car taken substantially along line 4—4 of FIG. 3.

Referring to FIGS. 2–4, two pairs of wedge shaped inclined ramps 52 and 54 are firmly mounted to the sides of the beams 49 and 50 nearest and in the berth 46. The ramps are horizontally spaced from each other, one set of ramps 54 being positioned adjacent the aisles and the other set of ramps 52 being positioned substantially further into the transfer car berth 46. In addition, the inclined surfaces 56 and 58 of the ramps 52 and 54, respectively, are spaced in elevation from each other, as shown in FIGS. 2 and 4, the surfaces 56 of ramps 52 being spaced a greater distance from the floor 38 than the surfaces 58 of ramps 54.

A powered lug assembly 60 is also mounted on the transfer car bed 32 for drawing the load carrier 16 fully into the transfer car berth in preparation for transfer of the load carrier between the aisles. The lug assembly 60 comprises a plurality of driven endless chains 62 extending parallel to and inside beams 49 and 50. These chains are driven by way of a sprocket and drive chain set 64 which is powered by suitable power means, such as motor 66. The latter set 64 and motor 66 may be covered by a housing 68 as shown in FIG. 1 to reduce the hazard to personnel. One or more lugs 70 are attached to the chains 62 and are adapted to move in a circular direction, when the chains to which the lugs are attached are driven by motor 66.

At least two sets of supporting rollers 72 and 74 are rotatably mounted upon opposite sides of the load carrier bed 20 and extend from the sides of the bed. These rollers 72 and 74 are spaced from each other in the horizontal by a distance which is substantially equal to the distance that the ramps 52 and 54 are horizontally spaced from each other. In addition, rollers 72 and 74 are also spaced from each other in elevation by a distance such that when the wheels 21 and 22 of the load carrier rest upon the floor surface 38, the rollers 72 will be slightly higher than the point of highest elevation of the surface 58 of ramps 54, but will be at substantially the same elevation as the point of lowest elevation of the surface 56 of ramps 52, and rollers 74 will be at the substantially same elevation as the point of lowest elevation of the surface 58 of ramps 54. Accordingly, when the load carrier is being moved into and out of the berth 46 under its own power, rollers 72 will pass over and clear ramps 54, but will engage the surfaces of ramps 52.

Rigid pins 76 also extend from the opposite sides of the bed 20 of the load carrier adjacent rollers 72. Pins 76 are elevationally spaced from floor surface 38 so as to clear both ramps 52 and 54, but are positioned such that when the rollers 72 have just come into contact with the point of minimum elevation of the surfaces 56 of their ramps 52, the pins will be positioned in the path of movement of the lugs 70 and are engaged thereby.

Suitable guide structure 78 is also preferably provided as part of the structure of the transfer car 30 and extends upward from the transfer car bed 32 so as to laterally support and guide the load carrier 16 intermediate its height, both during positioning of the load carrier upon the transfer car and during transfer of the load carrier between the aisles. In addition one or more guides 80 may also be mounted to beams 49 and/or 50 to guide the load carrier bed 20 during positioning of the load carrier into berth 46 and upon the ramps 52 and 54 of the transfer car.

The operation of the preferred embodiment of storage and retrieval system and transfer car arrangement of the present invention which has thus far been described is as follows:

Initially it will be assumed that the load carrier 16 has been operating in one of the given aisles 14 and that it is now desired to transfer the load carrier to another of the aisles 14' for operation. The transfer car 30 is first positioned at the end of the aisle 14 in which the load carrier is presently located, such that the berth 46 of the transfer car is aligned with the aisle 14.

The load carrier 16 is now operated under its own power so as to move longitudinally in the aisle toward the transfer car, and thence from the end of the aisle 14 into the transfer car berth 46. Once the rollers 72 and 74 of the load carrier are positioned adjacent the right lower ends of the ramps 52 and 54, respectively, as shown in the dotted position in FIG. 4, the power drive to the load carrier is secured either manually or automatically. Due to the predetermined elevational spacing of the surfaces 56 and 58 of ramps 52 and 54 and rollers 72 and 74, the load carrier will freely move into berth 46 and rollers 72 will pass over and clear ramp surfaces 58. When the load carrier has been moved to this point, as shown in dotted in FIG. 4, it will be observed that the wheels 21 and 22 of the load carrier still rest upon the coplanar floor surface 38.

Motor 66 is now energized so as to drive chain 62 in the counterclockwise direction as viewed in FIGS. 2 and 4. Lugs 72 will now be rotated by the chain 62 and the leading edge of the lugs will contact and engage pins 76. As the lugs continue to rotate in the counterclockwise direction, they will exert a force on the load carrier so as to pull the load carrier to the left, as viewed in FIGS. 2 and 4, and the rollers 72 and 74 will roll up their respective surfaces 56 and 58 of ramps 52 and 54. When the rollers 72 and 74 have been positioned adjacent the point of maximum elevation of the surfaces 56 and 58 of ramps 52 and 54, the power to motor 66 is secured and the lugs will stop moving in situ and prevent the rollers from rolling back down the ramps by gravity. The load carrier has now been positioned upon the transfer car, as shown in dot and dash in FIGS. 2 and 4, in readiness for transfer and its wheels 21 and 22 have been lifted and spaced from the floor surface 38.

The motor 42 of the transfer car 30 is now energized to drive the transfer car wheels 33–36 so as to propel the transfer car with the load carrier supported thereon in the direction in which it is desired to move the load carrier. Once the berth 46 of the transfer car, in which the load carrier is supported, is aligned with the aisle 14' in which it is desired to now operate the load carrier, the transfer car is stopped and motor 66 is energized in the reverse direction. Reversal of motor 66 now drives the lugs 70 in a clockwise rotational direction as viewed in FIGS. 2 and 4, allowing the rollers 72 and 74 to roll down the inclined surfaces 56 and 58 of ramps 52 and 54 until they are again positioned at the bottom of the ramps as shown in the dotted position in FIG. 4 and the rollers 21 and 22 of the load carrier again rest on the floor surface 38. At this point, the load carrier 16 is again energized and is longitudinally moved out of the berth 46 and into the aisle 14' in which it is now desired to operate, rollers 72 passing over and clearing the point of maximum elevation of the ramps 54 enroute out of the berth.

It will be seen that if for some reason the rollers 72 and 74 do not roll down the ramps 52 and 54 when the lugs 70 have been removed from the aisle side of pins 76, as the chain 62 continues to rotate in the clockwise direction, the opposite side of the lugs 70 will eventually come to bear against the pins 76 to assist movement of the rollers down the ramps.

Upon consideration of the above description of the preferred embodiment of the invention, it will be understood that both the transfer car 30 and the load carrier 16 of the present invention may be readily operated upon a coplanar common floor surface 38 and 40 without the need for provision of elaborate overhead structures, pit and rail constructions and without the disadvantages of increased expense and personnel safety hazards associated with such constructions, and yet the load carrier of the present invention may be rapidly and easily transferred between the aisles of the storage system. Moreover, by eliminating the need for rails in the present invention, the wheels or tires 21, 22 and 33–36 may be pneumatic tires or formed of soft material so as to substantially reduce operational noise levels.

It should be understood that the embodiment of the present invention which has been described is merely illustrative of one of the applications of the principles of the invention. Numerous modifications may be made by those skilled in the art without departing from the true spirit and scope of the invention.

What is claimed is:

1. A multivehicle arrangement comprising,
a first vehicle including means supporting said first vehicle upon and in contact with a given plane for movement upon and in contact with said given plane and in a first predetermined linear direction,
a second vehicle also including means supporting said second vehicle upon and in contact with the same said given plane for movement upon and in contact with said given plane, but in a second predetermined linear direction substantially perpendicular to said first predetermined direction,
- a berth defined by said second vehicle and opening toward said given plane for receiving at least a substantial portion of said first vehicle while said first vehicle is supported upon and in contact with said given plane, said first vehicle being receivable in said berth when said first vehicle is moved in said first predetermined direction toward and into said berth,
- first and second incline means positioned on one of said first vehicle or within the berth of said second vehicle, said incline means being spaced from each other in said first predetermined direction,
- first and second movable support means positioned on the other of said first vehicle or within the berth of said second vehicle, said first and second incline means and said first and second movable support means being spaced from each other such that they engage each other, respectively, when said first vehicle has moved to a first given position in said berth in which said first vehicle has moved for a substantial distance into said berth,
- powered urging means exerting a force between said first and second vehicles when said first vehicle has reached said first given position in said berth to urge said first vehicle to a second given position in said berth further into said berth than said first given position, said means supporting said first vehicle being progressively elevated above said given plane by continued engagement between said first and second incline means and said first and second movable support means as said first vehicle moves from said first to said second given positions such that said first vehicle is supported entirely above said given plane, whereby both of said vehicles may be moved simultaneously in said predetermined second direction when said first vehicle has been positioned in said second given position.

2. The arrangement of claim 1 wherein said first and second incline means comprise ramp means inclined relative to said given plane.

3. The arrangement of claim 2 wherein said ramp means are positioned upon said second vehicle and said first and second movable support means comprise roller means engagable with said ramp means and positioned upon said first vehicle.

4. The arrangement of claim 1 wherein said powered urging means comprises engaging means on said second vehicle for engaging and positioning said first vehicle in said second given position.

5. The arrangement of claim 4 wherein said engaging means includes lug means on said second vehicle, pin means positioned upon said first vehicle, and power means drivingly associated with said lug means to move said lug means into engagement with said pin means to move said first vehicle onto said first and second incline means.

6. The combination of claim 1 including
- first and second rollers on said first vehicle, said first rollers being spaced from said second rollers in both the horizontal and vertical directions,
- first and second inclined ramps on said second vehicle having surfaces thereon which are inclined relative to said given plane and which are adapted to supportably receive said first and second rollers, respectively, the inclined surface of said first ramp also being spaced both horizontally and vertically from the surface of said second ramp and the maximum elevation of the surface of said second ramp above said given plane being less than the minimum elevation of said first roller above said given plane whereby said first roller and the inclined surface of said second ramp clear each other when said first vehicle is moving toward said first given position, and
- powered lug means on said second vehicle engagable with said first vehicle to position said first and second rollers upon the surfaces of said first and second ramps and adjacent the maximum elevation thereof above said given plane.

7. The arrangement of claim 1 including in combination therewith, a plurality of storage frames arranged in spaced relationship to each other so as to define a plurality of longitudinally extending aisles therebetween, said given plane comprising the floor areas in said aisles and beyond at least one end of said aisles, said floor areas being coplanar with each other, said first vehicle comprising load carrier means adapted to position articles to be stored relative to said frames and being movable longitudinally in said aisles, and said second vehicle comprising transfer means movable across said end of said aisles for moving the load carrier means transversely of and between said aisles.

8. The arrangement of claim 7 wherein said means supporting said first vehicle comprise rollers rollably contacting the surface of said floor and being rotatable about axes parallel to the transverse movement of said transfer means between said aisles, and said means supporting said second vehicle also comprise rollers rollably contacting the surface of said floor and being rotatable about axes parallel to the longitudinal movement of said load carrier means, the rollers of said first means being elevated above said coplanar floor when said load carrier means is being transferred between said aisles.

9. The arrangement of claim 7 including first and second rollers on said load carrier means, said first rollers being spaced from said second rollers in both the horizontal and vertical directions,
- first and second inclined ramps on said transfer means having surfaces thereon which are inclined relative to said floor and which are adapted to supportably receive said first and second rollers, respectively, the inclined surface of said first ramp being spaced horizontally from the surface of said second ramp and further from the end of said aisles than said second ramp and the surfaces of said first and second ramps also being spaced from each other such that said first roller and the inclined surface of said second ramp clear each other when said load carrier means is being moved to said first given position, and
- powered lug means on said transfer means engagable with said load carrier means to position said first and second rollers upon the surfaces of said first and second ramps and adjacent the maximum elevation thereof above said floor.

10. The arrangement of claim 9 wherein the maximum elevation of the surface of said second ramp above said floor is less than the minimum elevation of said first roller above said floor, whereby said first roller and the inclined surface of said second ramp clear each other when said load carrier means is being moved to said first given position.

11. The arrangement of claim 7 wherein said first and second incline means comprise ramp means inclined relative to the plane of said floor, and said first and second movable support means comprise roller means engagable with said ramp means.

12. The arrangement of claim 11 wherein said ramp means are positioned upon said transfer means and said roller means are positioned upon said load carrier means and are cooperatively associated with said ramp means to space said means supporting said first vehicle above said floor when said load carrier means is being transferred between said aisles.

13. The arrangement of claim 11 wherein said powered urging means includes movable lug means engaging and exerting a force between said load carrier means and said transfer means for positioning said means supporting said first vehicle in spaced relationship above said floor.

* * * * *